United States Patent [19]
Lee

[11] Patent Number: 6,005,732
[45] Date of Patent: Dec. 21, 1999

[54] DEVICE AND METHOD FOR RESTORING DATA IN DIGITAL VCR

[75] Inventor: Jung Kyu Lee, Seoul, Rep. of Korea

[73] Assignee: LG Electronics Inc., Seoul, Rep. of Korea

[21] Appl. No.: 08/744,872

[22] Filed: Nov. 8, 1996

[30] Foreign Application Priority Data

Nov. 8, 1995 [KR] Rep. of Korea ................ 95/40182
Dec. 30, 1995 [KR] Rep. of Korea ................ 95/69296
Oct. 4, 1996 [KR] Rep. of Korea ................ 96/43857

[51] Int. Cl.$^6$ .................................................. G11B 5/035
[52] U.S. Cl. ............................ 360/65; 360/48; 386/1; 386/21; 386/40; 386/113; 386/116; 386/124; 386/46
[58] Field of Search ................ 360/65, 48; 386/1, 386/21, 40, 113, 116, 124, 46

[56] References Cited

U.S. PATENT DOCUMENTS 4,698,811 10/1987 Eto et al. .................................. 371/38

*Primary Examiner*—Aristotelis M. Psitos
*Assistant Examiner*—Joseph M. Vann
*Attorney, Agent, or Firm*—Loeb & Loeb LLP

[57] ABSTRACT

Device and method for restoring data in a digital VCR is disclosed in which redundancy is provided for detection of more reliable user data. The device optimally equalizes data reproduced in the VCR, and employs comparison detection in restoring the equalized data at the present time. This is accomplished by comparing the equalized data, at the present time, to either an even series prior data or an odd series prior data which has passed through the equalizing part. Determination of the data, at the present time, as not being of a positive polarity where the prior data is determined to be of a positive polarity and determination of the data, at the present time, as not being of a negative polarity where the prior data is determined to be of a negative polarity, thereby prevents the wrong determination applied to the above determination result in restoring the data to the present time.

26 Claims, 9 Drawing Sheets

| | t= k-6 | k-4 | k-2 | k | k+2 | |
|---|---|---|---|---|---|---|
| slicing level in the reference comparing part | ±1 (initial value) | -1 | ±1 | ±1 | ±1 | ..... |
| original data | 1 | 0 | 0 | 0 | ..... | |
| detected data | 1 | 0 | 0 | 1 | ..... | error occurrence |

| | t= k-6 | k-4 | k-2 | k | k+2 | |
|---|---|---|---|---|---|---|
| slicing level in the reference comparing part | ±1 (initial value) | -1 | -1 | -1 | -1 | .... |
| original data | 1 | 0 | 0 | 0 | ..... | |
| detected data | 1 | 0 | 0 | 0 | ..... | no error |

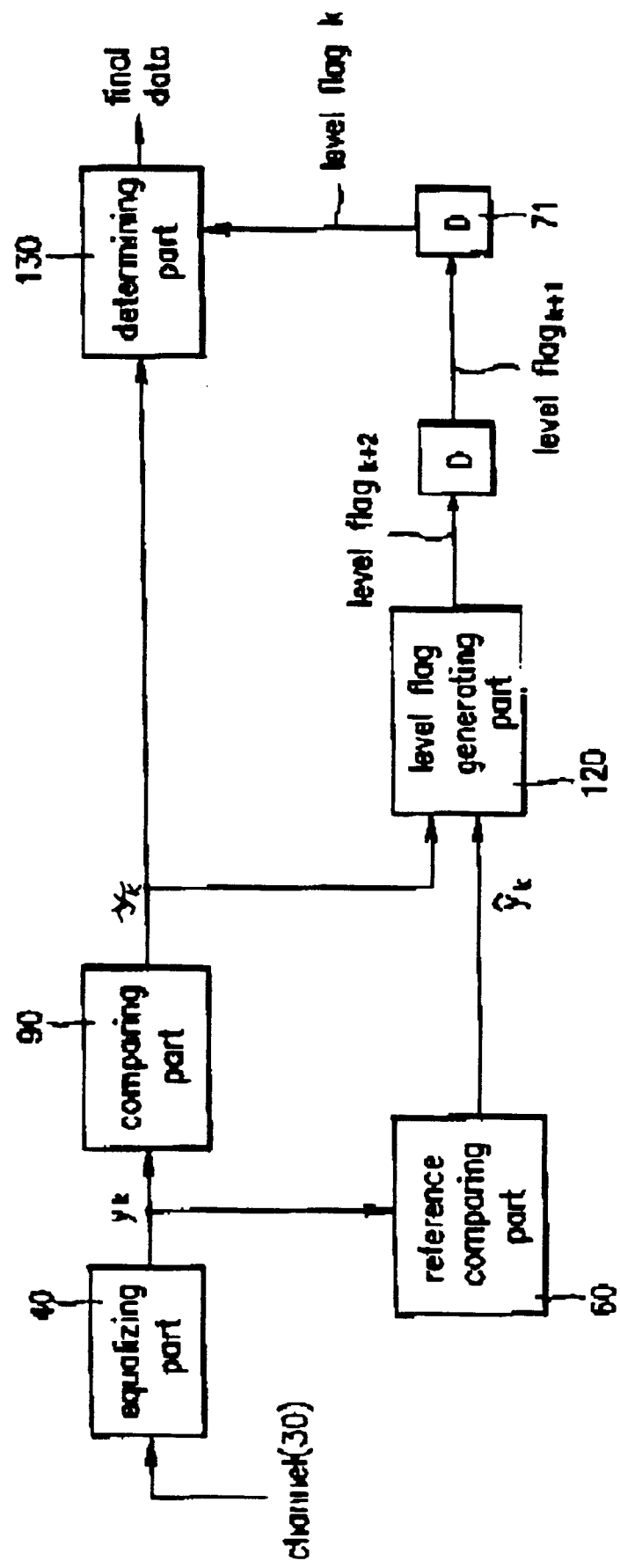

| $\hat{y}_k$ | level flag$_k$ | final data |
|---|---|---|
| 0<br>0<br>0 | 0<br>+<br>− | 0<br>0<br>0 |
| 2<br>2<br>2 | 0<br>+<br>− | 1<br>1<br>0 |
| −2<br>−2<br>−2 | 0<br>+<br>− | 1<br>0<br>1 |

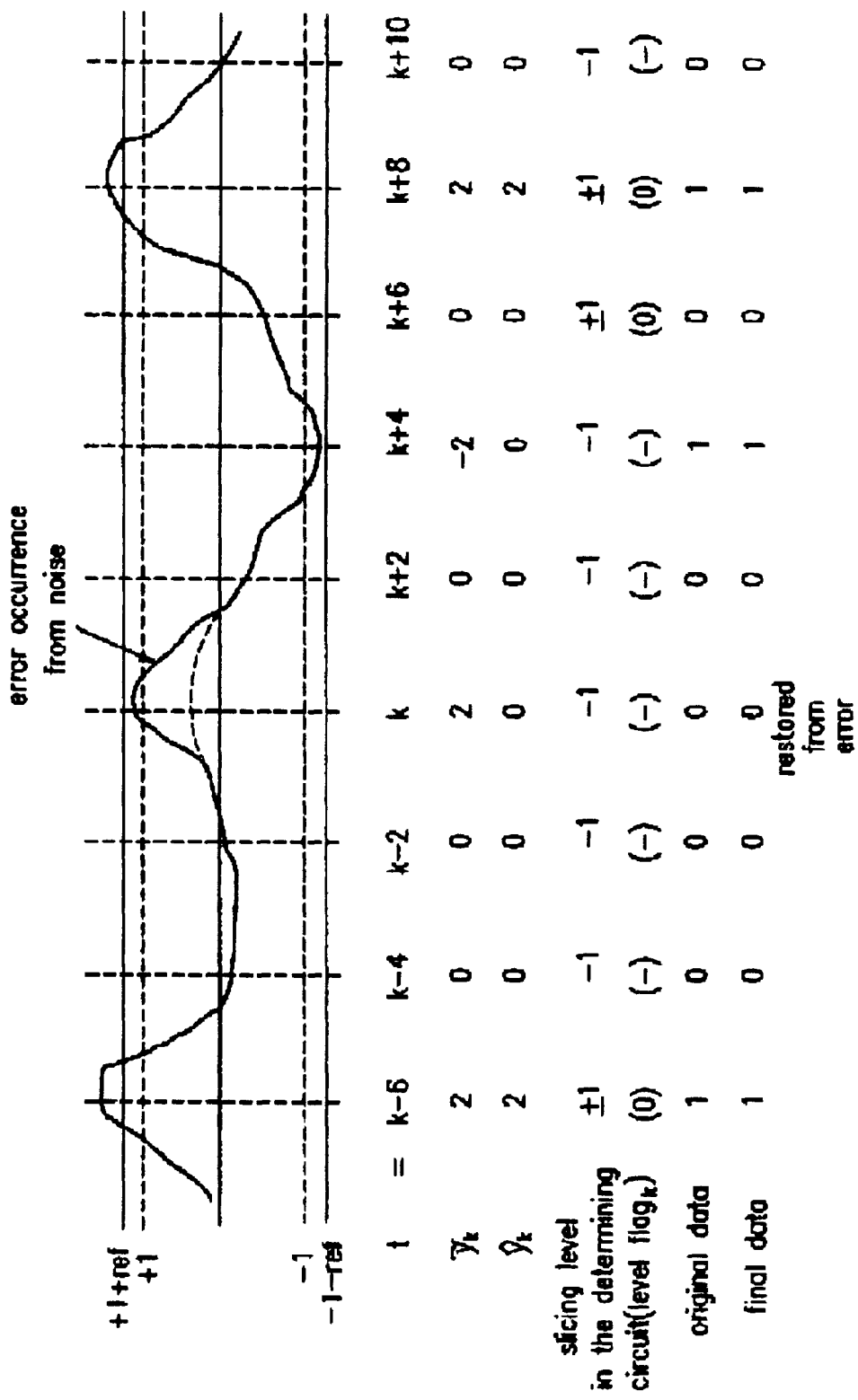

DEVICE AND METHOD FOR RESTORING DATA IN DIGITAL VCR

BACKGROUND OF THE INVENTION

1. Field of the Invention

The present invention relates to a digital VCR and more particularly, to a device and a method for restoring data in a digital VCR in which redundancy is provided for more reliable detection of user data.

2. Discussion of the Related Art

A conventional data restoring device in a DVCR (Digital VCR) will be explained with reference to the attached drawings.

FIG. 1 illustrates a block diagram of a system of the conventional data restoring device in a DVCR, FIG. 2 illustrates a data detection method of the comparison detection part of FIG. 1, and FIGS. 3a and 3b illustrate ideal data produced from the equalizing part in FIG. 1.

Referring to FIG. 1, the conventional data restoring device in a DVCR includes a pre-coder 10 for encoding received user data with leading arbitrary code, data converting part 20 for data conversion of a logic signal from the pre-coder 10 into an arbitrary voltage, a channel 30 for transmission of data converted in the data converting part 20, an equalizing part 40 for optimum equalization of the data received through the channel 30, and a comparison detecting part 50 for comparing the optimum equalized data in the equalizing part 40 to a preset reference value in detecting user data. For encoding the received user data, the pre-coder 10 has delays 11 and 12, and for modeling an actual channel, the channel 30 has delays 31 and 32.

The operation of the aforementioned system will be explained with reference to TABLE 1 shown below. TABLE 1 illustrates an example of data flow in the conventional data restoring device in a DVCR.

even data and a series of odd data that shows a redundancy. All the symbols that are not "0" in each of the even and odd series have polarities different from prior symbols that are "0". In other words, if a symbol at a certain moment has a value of +2 or −2, a symbol at the next clock moment has a value of 0 or −2, or 0 or +2, but not +2 or −2.

The data value $y_k$ applied to the comparison detection part 50 is compared and detects the data in the three level detection method as shown in FIG. 2, to detect the user data $\hat{b}_k$. That is, referring to FIG. 2, in the three level detection method, a data signal received through the equalizing part 40 is determined to be a binary logic signal of "1" with reference to two threshold values of "+1" and "−1", when the applied signal is over "+1", a binary logic signal of "1" is generated for detecting the user data, when the applied signal is below "−1" a binary logic signal of "1" is generated for detecting the user data, and when the applied signal is a data signal between "+1" and "−1" a binary logic signal of "0" is generated for detecting the user data for detecting the user data.

Therefore, because the aforementioned three level detection method applied to the conventional data restoring system in a DVCR cannot utilize signaling redundancy, the conventional data restoring system has problems in that its reliability in the detection of user data is low, and it has no capability for correcting errors occurred in the received data.

SUMMARY OF THE INVENTION

Accordingly, the present invention is directed to a device and method for restoring data in a digital VCR that substantially obviates one or more of the problems due to limitations and disadvantages of the related art.

Additional features and advantages of the invention will be set forth in the description which follows, and in part will be apparent from the description, or may be learned by practice of the invention. The objectives and other advan-

TABLE 1

| $b_k$ | 0 | 0 | 0 | 0 | 1 | 1 | 1 | 1 | 0 | 0 | 1 | 1 | 0 | 1 | 0 | 1 | 1 | 0 | 1 | 0 |
|---|---|---|---|---|---|---|---|---|---|---|---|---|---|---|---|---|---|---|---|---|
| $a_k$ | 0 | 0 | 0 | 0 | 1 | 1 | 0 | 0 | 0 | 0 | 1 | 1 | 1 | 0 | 1 | 1 | 0 | 1 | 1 | 1 |
| $x_k$ | −1 | −1 | −1 | −1 | 1 | 1 | −1 | −1 | −1 | −1 | 1 | 1 | 1 | −1 | 1 | 1 | −1 | 1 | 1 | 1 |
| $y_k$ | — | — | 0 | 0 | 2 | 2 | −2 | −2 | 0 | 0 | 2 | 2 | 0 | −2 | 0 | 2 | −2 | 0 | 2 | 0 |
| $\hat{b}_k$ | — | — | 0 | 0 | 1 | 1 | 1 | 1 | 0 | 0 | 1 | 1 | 0 | 1 | 0 | 1 | 1 | 0 | 1 | 0 |

Referring to FIG. 1, upon reception of user data $b_k$ recorded on a magnetic recording medium through a reproduction head (not shown), the pre-coder 10 has the delays 11 and 12 to encode the user data $b_k$ into a $b_k \oplus a_{k-2}$ model. That is, the user data $b_k$ received at the present time and data obtained by delaying the data from the pre-coder 10 two times through the delays 11 and 12 are subjected to an exclusive OR operation to produce an encoded value of $a_k$. The data $a_k$ from the pre-coder 10 converts binary data "0" and "1" applied to the data converting part 20 into voltage values of "−1" and "1" to produce an $x_k$ value. Thus, when the $a_k$ value from the pre-coder 10 is "0", the data is converted into "−1", and if the value is "1", the data is converted into "1". The $x_k$ value, thus data converted, is applied to the equalizing part 40 through the channel 30 in which the $x_k$ value is modeled in an $x_k - x_{k-2}$ form. The equalizing part 40 then optimizes the equalization of the signal from the channel 30 to produce and apply a $y_k$ value to the comparison detection part 50.

Referring to FIGS. 3a and 3b, a series of the $y_k$ data through the equalizing part 40 can be divided into a series of tages of the invention will be realized and attained by the structure particularly pointed out in the written description and claims thereof, as well as the appended drawings.

To achieve these and other advantages and in accordance with the purpose of the present invention, as embodied and broadly described, a device for restoring data in a digital VCR, the device including a equalizing means for optimally equalizating data reproduced in the VCR and comparison detection means for restoring the equalized data at a present time in the equalizing means by comparing the equalized data at the present time to either an even series prior data or an odd series prior data that was previously passed through the equalizing part, thereby determining that the data at the present time is not of a positive polarity when the prior data is determined to be of a positive polarity and that the data at the present time is not of a negative polarity when the prior data is determined to be of a negative polarity, this further preventing an incorrect determination of the above determination results in restoring the data of the present time.

In another aspect of the present invention, there is provided a device for restoring data in a digital VCR having an equalizing part, the device including a first comparison detection means for comparing data from the equalizing part to a comparative reference level in detecting the data, delay means for delaying the data detected in the first comparison detection means for a predetermined time, and variable level comparison means for variably changing a compared reference value with reference to either an even series prior data or an odd series prior data received from the delaying means for producing user data in determining data of the present time received from the equalizing part.

In another aspect of the present invention, there is provided a device for restoring data in a digital VCR having an equalizing part, the device including a first and second comparison detection means for comparing a signal from the equalizing part to a comparative reference level in detecting data, delay means for delaying the data detected in the second comparison detection means for a predetermined time, and logical comparison means utilized in determining data value of the present time received from the first comparison detection means, restoring user data according to a preset logical operation equation based both on an even series or an odd series prior data received from the delaying means and the data received at the present time.

In a further aspect of the present invention, there is provided a method for restoring data in a device for restoring the data in a digital VCR, the digital VCR having a magnetic reproduction head, the method including a (1) reproducing user data recorded in the digital VCR by the magnetic head, (2) comparing the reproduced user data to a preset comparative reference level in detecting data, (3) comparing the reproduced user data to a different preset another comparative reference level in determining data, and (4) in determining data value, at the present time, compared and detected in step (2), restoring the user data according to a preset logical operation equation based both on even series prior data values or odd series prior data values delayed in step (3) for a predetermined time and the data values compared and detected in the step (2).

In still another aspect of the present invention, there is provided a device for restoring data in a digital VCR, the digital VCR having an equalizing part, the device including a first comparison detection means for comparing a signal from the equalizing part to a comparative reference level in detecting data, second comparison detection means for comparing the signal from the equalizing part to a different comparative reference level in detecting data, level flag generating means for generating a level flag according to the data detected in the first, and second comparison detection means, delaying means for delaying the generated level flag for a predetermined time, and determining means for determining a slicing level according to the delayed level flag and the data detected in the first comparison detection means in determining final user data and restoring the final user data.

In yet another aspect of the present invention, there is provided a method for restoring data in a device for restoring data in a digital VCR, the digital VCR having a magnetic reproduction head, the method including a (1) reproducing user data recorded in the digital VCR by the reproduction head, (2) comparing the reproduced user data to a preset comparative reference level in detecting data, (3) comparing the reproduced user data to a different preset comparative reference level in detecting data, (4) generating +, −, and 0 level flags according to the data detected in steps (2) and (3), and (5) delaying the generated level flags for a predetermined time and comparing one of the delayed level flags and the data detected in step (2) in determining user data and restoring the determined user data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 8 illustrates a block diagram of a system of a data restoring device in a DVCR in accordance with a third preferred embodiment of the present invention;

FIG. 11 explains a data detection principle of the data restoring device shown in FIG. 8.

DETAILED DESCRIPTION OF THE PREFERRED EMBODIMENTS

Reference will now be made in detail to the preferred embodiments of the present invention, examples of which are illustrated in the accompanying drawings.

A First Embodiment

Figure 4:
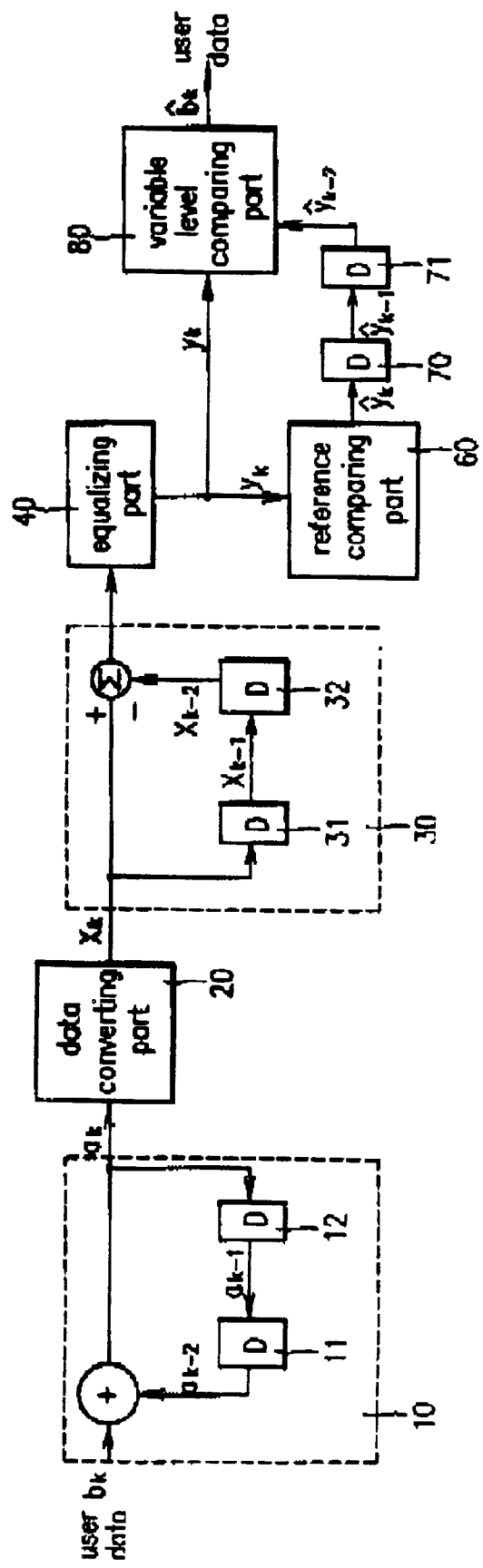
FIG. 4 illustrates a block diagram of a system of a data restoring device in a DVCR in accordance with a first preferred embodiment of the present invention.
Figure 5:
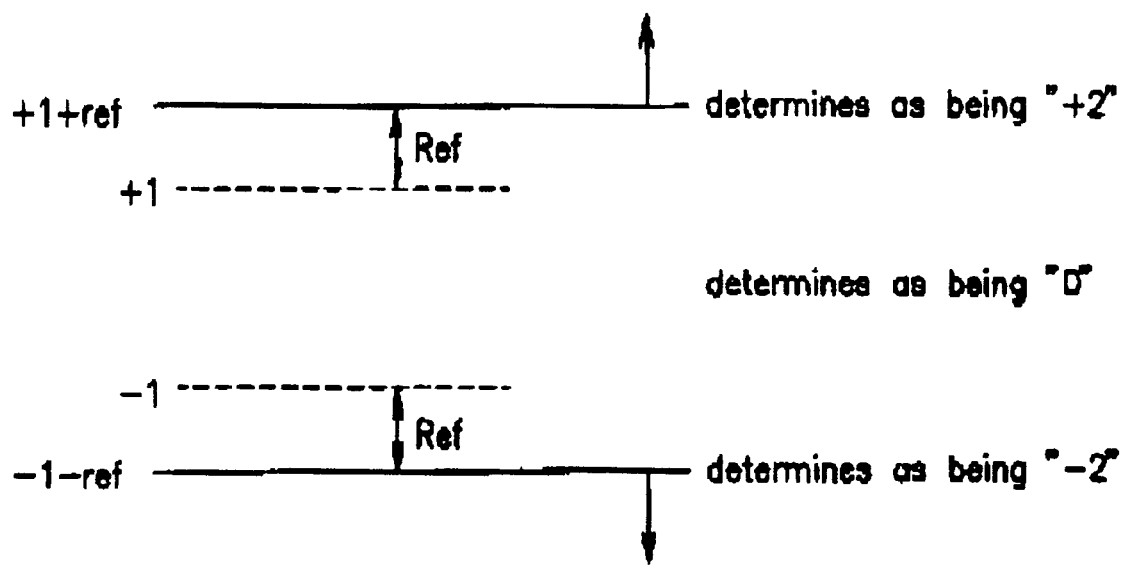
FIG. 5 illustrates a data detection method of a reference comparison part in the data restoring device shown in FIG. 4.

FIG. 4 illustrates a block diagram of a system of a data restoring device in a DVCR in accordance with a first preferred embodiment of the present invention, and FIG. 5 illustrates a data detection method of a reference comparison part shown in the data restoring device shown in FIG. 4.

Figure 1:
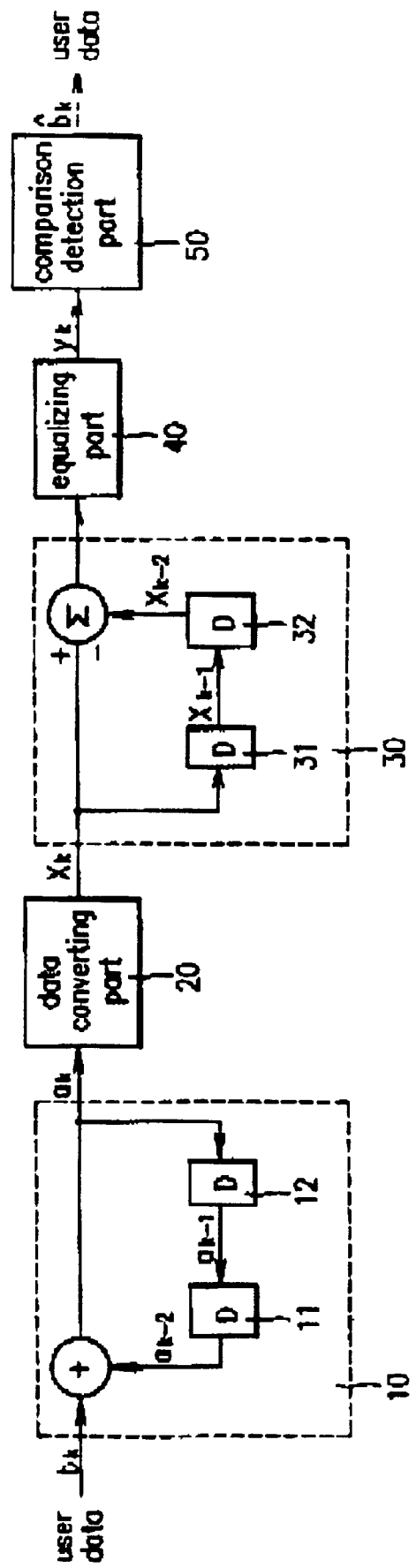
FIG. 1 illustrates a block diagram of a system of a conventional data restoring device in a DVCR.

Referring to FIG. 4, the data restoring device includes a pre-coder 10, a data converting part 20, a channel 30, an equalizing part 40, a reference comparing part 60, delays 70 and 71 and a variable level comparing part 80. Explanations on system elements which are duplicated by the conventional system elements shown in FIG. 1 will be omitted.

The reference comparing part or comparison detection part 60 detects more accurate data from the optimum equalized data received from the equalizing part 40 according to a reference of a predetermined level, i.e., a reference (±1±ref) obtained by adding ±ref to the threshold voltage ±1 in the conventional three level detection method. Each of the first and second delays 70 and 71 delay the data detected in the reference comparing part 60 for a predetermined time, and the variable level comparing part 80 compares and detects the user data from the signal delayed through the first and second delays 70 and 71 and the data is optimally equalized through the equalizing part 40.

greater than −1, the variable level comparing part 80 produces "0" as the user data. And, if the data $\hat{y}_k$ from the equalizing part 40 is smaller than −1, the variable level comparing part 80 produces "1" as the user data.

TABLE 2

| $b_k$ | 0 | 0 | 0 | 0 | 1 | 1 | 1 | 1 | 0 | 0 | 1 | 1 | 0 | 1 | 0 | 1 | 1 | 0 | 1 | 0 | | |
|---|---|---|---|---|---|---|---|---|---|---|---|---|---|---|---|---|---|---|---|---|---|---|
| $a_k$ | 0 | 0 | 0 | 0 | 1 | 1 | 0 | 0 | 0 | 0 | 1 | 1 | 1 | 0 | 1 | 1 | 0 | 1 | 1 | 1 | | |
| $x_k$ | −1 | −1 | −1 | −1 | 1 | 1 | −1 | −1 | −1 | −1 | 1 | 1 | 1 | −1 | 1 | 1 | −1 | 1 | 1 | 1 | | |
| $y_k$ | — | — | 0 | 0 | 2 | 2 | −2 | −2 | 0 | 0 | 2 | 2 | 0 | −2 | 0 | 2 | −2 | 0 | 2 | 0 | | |
| $\hat{y}_{k-1}$ | — | 0 | 0 | 0 | 2 | 2 | −2 | −2 | 0 | 0 | 2 | 2 | 0 | −2 | 0 | 2 | −2 | 0 | 2 | 0 | | |
| $\hat{y}_{k-2}$ | — | 0 | 0 | 0 | 0 | 2 | 2 | −2 | −2 | 0 | 0 | 2 | 2 | 0 | −2 | 0 | 2 | −2 | 0 | 2 | 0 | |
| $b_k$ | — | 0 | 0 | 1 | 1 | 1 | 1 | 0 | 0 | 1 | 1 | 0 | 1 | 0 | 1 | 1 | 0 | 1 | 0 | | | |

Referring to above TABLE 2 and FIG. 4, the operation of this embodiment will be explained. The above TABLE 2 illustrates data from each of the elements in this embodiment system.

First, referring to FIG. 4, upon reception of a user data $b_k$ reproduced from a magnetic recording medium, the pre-coder 10 encodes it into $b_k \oplus a_{k-2}$. That is, the user data $b_k$ received at the present time and the data from the pre-coder 10 delayed for two times are subjected to an exclusive OR operation to encode the user data $b_k$ into $a_k$ as shown in TABLE 2. The data $a_k$ from the pre-coder 10 is applied to the data converting part 20 for data converting a binary signal of "0" or "1" into "−1" or "1" respectively, to obtain $x_k$. The data converted $x_k$ is applied to the channel 30, is modeled with $x_k + x_{k-2}$, and applied to the equalizing part 40. A $y_k$ from the equalizing part 40 is applied both to the variable level comparing part 80 and the reference comparing part 60. As shown in FIG. 5, the reference comparing part 60 produces the $y_k$ into $\hat{y}_k = +2$ if the $y_k$ is greater than 1+ref, into $\hat{y}_k = -2$ if the $y_k < -1$-ref, and into $\hat{y}_k = 0$ if the $\hat{y}_k$ falls in the range other than those stated above. Thus, the converting $\hat{y}_k$ is converted into $\hat{y}_k = +2$, if the $y_k$ is greater than 1+ref is an imposition as done in a more stringent determining condition than converting $\hat{y}_k$ into $\hat{y}_k = +2$, if the $y_k$ is greater than 1, of the conventional three level detection method shown in FIG. 2. Accordingly, the converted +2 of the $\hat{y}_k$ is more reliable and promises a higher preciseness in using the redundancy.

The $\hat{y}_k$ thus detected in the reference comparing part 60 is passed through the first and second delays 70 and 71 to obtain the data $\hat{y}_{k-2}$ shown in TABLE 2. The data $\hat{y}_{k-2}$ is applied from the first and second delays 70 and 71 to the variable level comparing part 80, which has the effect, in view of the variable level comparing part 80, that even and odd data series are separated from one another. If the data at the prior clock moment, i.e., the data $\hat{y}_{k-2}$ is +2, the threshold value in the variable level comparing part 80 is −1 only. Accordingly, if the data $\hat{y}_k$ from the equalizing part 40 is On the other hand, if the data $\hat{y}_{k-2}$ is −2, the threshold value in the variable level comparing part 80 is +1 only. Accordingly, if the data $y_k$ from the equalizing part 40 is greater than +1, the variable level comparing part 80 produces "1" as the user data. If the data $\hat{y}_k$ from the equalizing part 40 is smaller than +1, the variable level comparing part 80 produces "0" as the user data.

If the data $\hat{y}_{k-2} = 0$, like the conventional three level detection method, the threshold values are determined to be ±1. Namely, if $\hat{y}_k > +1$, the threshold value is determined to be binary numeral 1, and if $\hat{y}_k < +1$, determined to be binary numeral 0, as the user data, and thus a user desired final user data $b_k$ can be obtained.

A Second Embodiment

Figure 6:
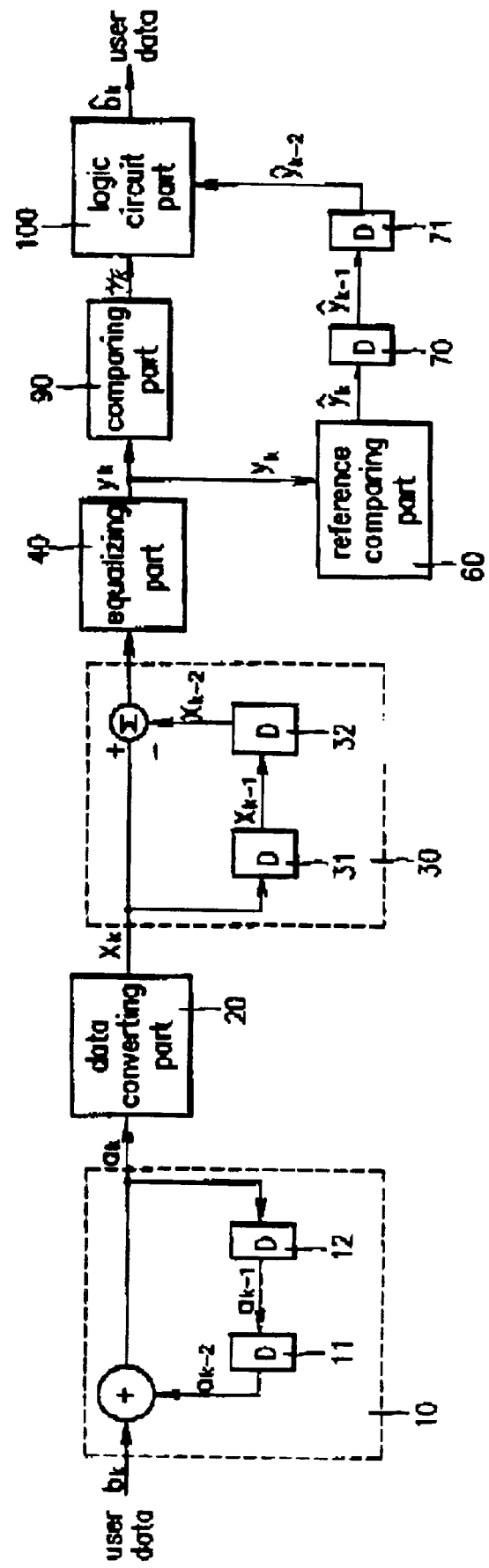
FIG. 6 illustrates a block diagram of a system of a data restoring device in a DVCR in accordance with a second preferred embodiment of the present invention.

FIG. 6 illustrates a block diagram of a system of a data restoring device in a DVCR in accordance with a second preferred embodiment of the present invention. In explanations on the second embodiment, explanations on identical system elements that are a duplication of the first embodiment system elements shown in FIG. 4 will be omitted.

Figure 2:
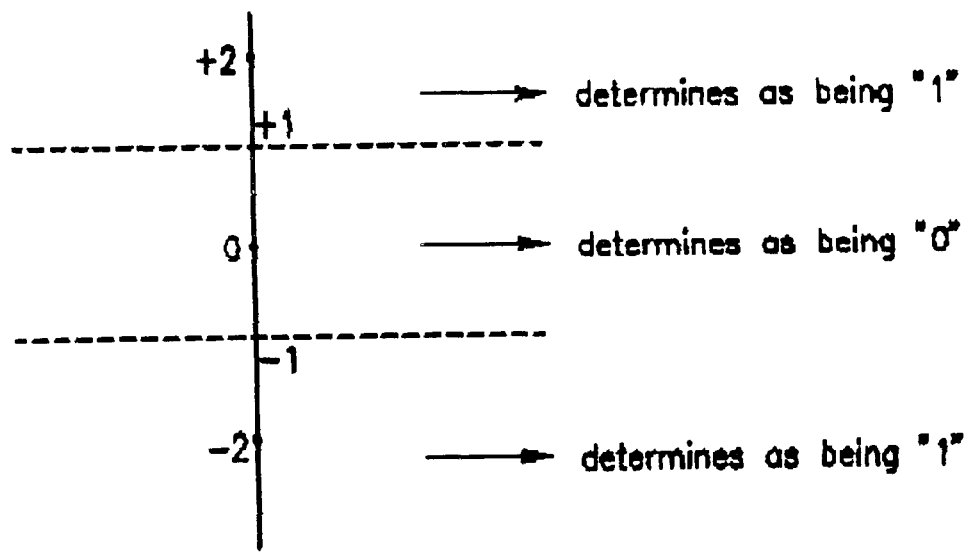
FIG. 2 illustrates a data detection method of the comparison detection part in FIG. 1.
Figure 3A:
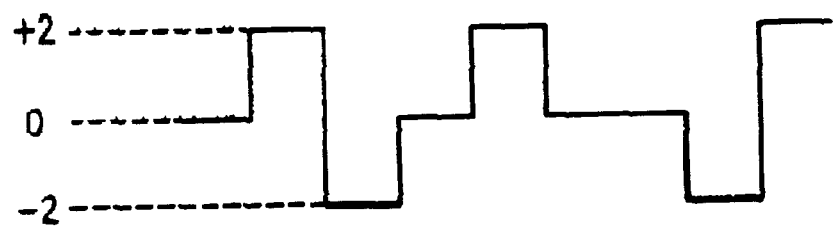
FIGS. 3a and 3b illustrate ideal data produced from the equalizing part in FIG. 1.
Figure 3B:
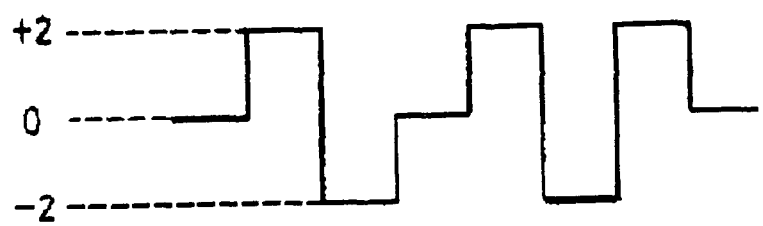

Referring to FIG. 6, the second embodiment data restoring device in a DVCR includes a comparing part 90 for comparing and detecting data from the equalizing part 40 in the three level detection method shown in FIG. 2, and a logic circuit part 100 for detecting final user data based on the data through the delays 70 and 71 in the first embodiment shown in FIG. 4 and the data compared and detected in the comparing part 90 according to a preset logic table.

The operation of the second embodiment system will be explained.

TABLE 3

| $b_k$ | 0 | 0 | 0 | 0 | 1 | 1 | 1 | 1 | 0 | 0 | 1 | 1 | 0 | 1 | 0 | 1 | 1 | 0 | 1 | 0 | | |
|---|---|---|---|---|---|---|---|---|---|---|---|---|---|---|---|---|---|---|---|---|---|---|
| $a_k$ | 0 | 0 | 0 | 0 | 1 | 1 | 0 | 0 | 0 | 0 | 1 | 1 | 1 | 0 | 1 | 1 | 0 | 1 | 1 | 1 | | |
| $x_k$ | −1 | −1 | −1 | −1 | 1 | 1 | −1 | −1 | −1 | −1 | 1 | 1 | 1 | −1 | 1 | 1 | −1 | 1 | 1 | 1 | | |
| $y_k$ | — | — | 0 | 0 | 2 | 2 | −2 | −2 | 0 | 0 | 2 | 2 | 0 | −2 | 0 | 2 | −2 | 0 | 2 | 0 | | |
| $\hat{y}_k$ | | | 0 | 0 | 2 | 2 | −2 | −2 | 0 | 0 | 2 | 2 | 0 | −2 | 0 | 2 | −2 | 0 | 2 | 0 | | |
| $\hat{y}_k$ | | | 0 | 0 | 2 | 2 | −2 | −2 | 0 | 0 | 2 | 2 | 0 | −2 | 0 | 2 | −2 | 0 | 2 | 0 | | |
| $\hat{y}_{k-1}$ | — | | 0 | 0 | 0 | 2 | 2 | −2 | −2 | 0 | 0 | 2 | 2 | 0 | −2 | 0 | 2 | −2 | 0 | 2 | 0 | |
| $\hat{y}_{k-2}$ | — | | 0 | 0 | 0 | 0 | 2 | 2 | −2 | −2 | 0 | 0 | 2 | 2 | 0 | −2 | 0 | 2 | −2 | 0 | 2 | 0 |
| $b_k$ | — | | 0 | 0 | 1 | 1 | 1 | 1 | 0 | 0 | 1 | 1 | 0 | 1 | 0 | 1 | 1 | 0 | 1 | 0 | | |

TABLE 3 shows output data from different elements in the second embodiment system of the present invention.

First, upon reception of user data $b_k$, the pre-coder 10 encodes it into $b_k \oplus a_{k-2}$. That is, the user data $b_k$ received at the present time and the data from the pre-coder 10 delayed for two times are subjected to an exclusive OR operation to encode the user data $b_k$ into $a_k$ as shown in TABLE 3. The data $a_k$ from the pre-coder 10 is applied to the data converting part 20 for data converting a binary signal of "0" or "1" into "−1" or "1" respectively, to obtain $x_k$. The data converted $x_k$ is applied to the channel 30, is modeled by $x_k - x_{k-2}$ into $y_k$ shown in TABLE 3, and applied both to the comparing part 90 and the reference comparing part 60. As shown in FIG. 5, the reference comparing part 60 converts the $y_k$ into $\hat{y}_k = +2$ if the $y_k$ is greater than 1+ref, into $\hat{y}_k = -2$ if the $y_k < -1$−ref, and into $\hat{y}_k = 0$ if the $\hat{y}_k$ falls within the range other than those stated above. Thus, the conversion of $\hat{y}_k$ into $\hat{y}_k = +2$ if the $y_k$ is greater than 1+ref, is an imposition of a more stringent determining condition than if $\hat{y}_k$ is converted into $\hat{y}_k = +2$ if the $y_k$ is greater than 1, as is done in the conventional three level detection method. Accordingly, the converted +2 of the $\hat{y}_k$ is more reliable, and promises a higher preciseness in using the redundancy.

The $\hat{y}_k$ thus detected in the reference comparing part 60 is passed through the first and second delays 70 and 71 to obtain the data $\hat{y}_{k-2}$ shown in TABLE 3. The data $\hat{y}_{k-2}$ through the delays 70 and 71 is applied to the logic circuit part 100. The data $\hat{y}_{k-2}$ passed through the equalizing part 40 is applied to the comparing part 90, wherein the data $\hat{y}_{k-2}$ is converted into $\tilde{y}_k$, which is +2 if the data $\hat{y}_{k-2} > +1$, is −2 if the data $\hat{y}_{k-2} > -1$, and determines to be 0 if the data $\hat{y}_{k-2}$ falls within a range other than those stated above, which is then applied to the logic circuit part 100 as shown in TABLE 3. User data $\hat{b}_k$ can be obtained from the $\tilde{y}_k$ and $\hat{y}_{k-2}$ applied to the logic circuit part 100 according to the following logic TABLE 4.

TABLE 4

| $\hat{y}_{k-2}$ | $\tilde{y}_k$ | $\hat{b}_k$ |
|---|---|---|
| +2 | +2 | 0 |
| +2 | 0 | 0 |
| +2 | −2 | 1 |
| −2 | +2 | 1 |
| −2 | 0 | 0 |
| −2 | −2 | 0 |
| 0 | +2 | 1 |
| 0 | 0 | 0 |
| 0 | −2 | 1 |

That is, when the data from the delay 71 and the reference comparing part 60 are (+2, +2), (+2, 0), (−2, 0), (−2, −2), (0, 0), respectively, user data "0" is restored. When the data from the delay 71 and the reference comparing part 60 are (+2, −2), (−2, +2), (0, +2), (0, −2), respectively, user data "1" is restored.

Figure 7A:
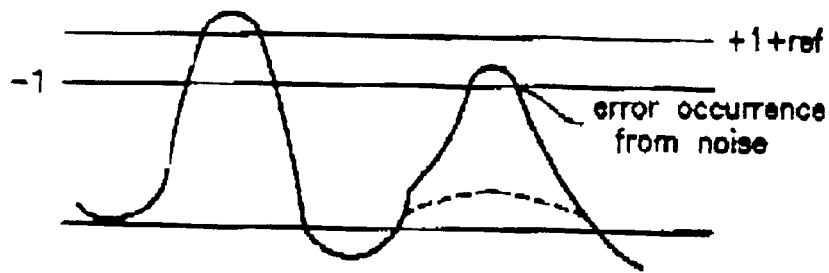
FIGS. 7a and 7b are a comparison of error correction capabilities of user data detection methods of the present invention and the conventional art.
Figure 7B:
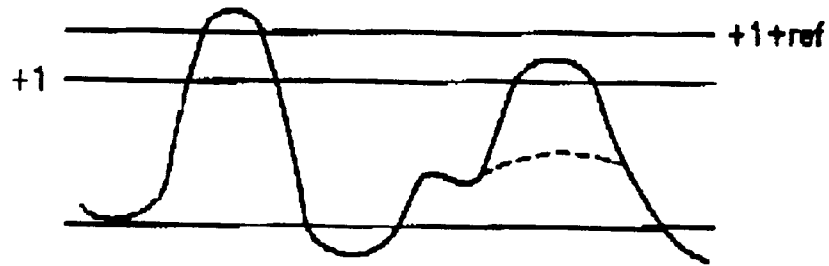

FIGS. 7a and 7b are a comparison on error correction capabilities of user data detection methods of the present invention and the conventional art.

First, the conventional user data detection method shown in FIG. 7a will be explained.

As a signal greater than +1+ref is received at time t=k−6, a slicing level is changed to −1 at the next time interval, i.e., at t=k−4. Since the received data at this time interval falls within a range that will be determined to be "0" by the reference comparing part 60, the slicing level at the next time interval t=k−2 produces two values, +1 and −1, which situation is continuous until t=k. Accordingly, since the data detected at t=k exceeds the slicing level +1, the final determination is binary numeral 1. Thus, a detection error has occurred.

On the other hand, in the new user data detection method of the present invention shown in FIG. 7b, if a received signal exceeding +1+ref or −1−ref is received, the slicing level at the next time is changed to −1 or +1. That is, the slicing level at t=k−4 is −1. This method is the same as the conventional method up to this step. In the conventional method, since the received signal at t=k−4 falls in a range that is determined to be "0", the slicing level at t=k−2 is changed to two values, +1 and −1. However, in the method according to the present invention, once the slicing level is changed to −1 or +1 upon reception of a received signal which exceeds +1+ref or −1−ref at a prior arbitrary time the slicing level is received, a signal which will be determined to be −2 or +2 in the reference comparing part 60 is received. With respect to the +1+ref or the −1−ref prior arbitrary time is a signal which will be determined to be +2 or −2 in the reference comparing part 60. With respect to the slicing level, it is maintained at −1 or +1 until a greater signal, which has a polarity opposite to the greater signal received previously at an arbitrary time, i.e., a signal which will be determined to be +2 or −2 in the reference comparing part 60. That is, the slicing level at t=k−4 is changed to −1 as depicted in the FIG. 7b case. However, different from the conventional method, this level is maintained as it was even at t=k−2, because the signal at t=k−2 also does not exceed −1−ref.

A Third Embodiment

The third embodiment of the present invention is designed to solve the condition not addressed in the first and second embodiments that even though the signaling redundancy is utilized in the aforementioned embodiments, since the satisfaction of the redundancy is confirmed just at the two adjoining times, a correct signal detection has not been possible.

The third embodiment of the present invention will be explained with reference to the attached drawings.

FIG. 8 illustrates a block diagram of a system of a data restoring device in a DVCR in accordance with the third preferred embodiment of the present invention. In the explanation of this third embodiment, explanations on system elements that are identical to the previous embodiments will be omitted.

Referring to FIG. 8, the third embodiment data restoring device includes a level flag generating part 120 for generating a level flag according to the data received from the comparing part 90 and the reference comparing part 60, delays 70 and 71 for delaying the level flag from the level flag generating part 120 for a predetermined period, and a determining part 130 for comparing the data through the delays 70 and 71 and the data through the comparing part 90 to determine a slicing level for determining a final user data.

The operation of the aforementioned system will be explained.

First, upon reception of reproduced user data through the channel 30, the equalizing part 40 optimizes the equalization of the data to suit to the channel characteristic to produce a signal, and then applies the signal both to the comparing part 90 and the reference comparing part 60.

In this instance, the comparing part 90 conducts the following function.

$$\tilde{y}_k = \begin{cases} +2, & \text{if } y_k \geq +1, \\ 0, & \text{if } -1 < y_k < +1, \end{cases}$$

and $$-2, \text{ if } y_k \leq -1.$$

That is, if the signal $y_k$ received at the comparing part 90 is equal to, or greater than +1, the signal is determined as being "+2", and if the signal is equal to, or smaller than −1, the signal is determined as being "−2", and is applied both to the level flag generating part 120 and the determining part. In case the signal applied to the comparing part 90 is greater than −1 but smaller than +1, the comparing part 90 determines it as being "0" and applies this determinant both to the level flag generating part 120 and the determining part 130.

On the other hand, the reference comparing part 60 conducts an operation as shown below.

+2, if $y_k \geq +1+\text{ref}$, $\hat{y}_k = 0$, if $-1-\text{ref} < y_k < +1+\text{ref}$, and −2, if $y_k \leq -1-\text{ref}$.

That is, the reference comparing part 60 determines the received data as being "+2" if the received data is greater than, or equal to +1+ref, (a basic comparing value), and as being "0" if the received data is greater than −1−ref but smaller than +1+ref, and applies the result to the level flag generating part 120. The reference comparing part 60 determines the received data as being "−2" if the received data is smaller than, or equal to −1−ref, and applies to the level flag generating part 120. Herein, the "ref" has a value greater than "0". Then, the level flag generating part 120 receives an output from the comparing part 90 and an output from the reference comparing part 60 to generate a level flag and applies to the first delay 70. The level flag applied to the determining part 130 through the delays 70 and 71 is used for the prior odd or even series data of the present data applied from the comparing part 90 to the determining part 130.

FIGS. 7a and 7b are a comparison of error correction capabilities of user data detection methods of the present invention and the conventional art.

First, the conventional user data detection method shown in FIG. 7a will be explained.

As a signal greater than +1+ref is received at time t=k−6, the slicing level is changed to −1 at the next time, i.e., at t=k−4. Since the received data at this time falls within the range that will be determined to be "0" by the reference comparing part 60, the slicing level at the next time t=k−2 produces two values of +1 and −1, which situation is continuous until t=k. Accordingly, since the data detected at t=k exceeds the slicing level +1, the final determination is binary numeral 1. That is, a detection error has occurred.

On the other hand, in the new user data detection method of the present invention shown in FIG. 7b, if a received signal exceeding +1+ref or −1−ref is received, the slicing level at the next time is changed to −1 or +1. That is, the slicing level at t=k−4 is −1. This method is the same with the conventional method up to this step. In the conventional method, since the received signal at t=k−4 falls on a range that is determined to be "0", the slicing level at t=k−2 is changed to the two values of +1 and −1. However, in the method according to the present invention, once the slicing level is changed to −1 or +1 upon reception of a received signal which exceeds +1+ref or −1−ref at a prior arbitrary time, (i.e., a signal which will be determined to be +2 or −2 in the reference comparing part 60), the slicing level, (i.e., −1 or +1 is maintained as it is until a greater signal), which has a polarity opposite to the greater signal received in the past at the arbitrary time, (i.e., a signal which will be determined to be +2 or −2 in the reference comparing part 60), is received. Thus, a signal which will be determined to be −2 or +2 in the reference comparing part 60 is received. The slicing level at t=k−4 is changed to −1 as in the FIG. 7b case. However, different from the conventional method, this level is maintained as it was even at t=k−2, because the signal at t=k−2 also does not exceed −1−ref.

Figures 9, 10:
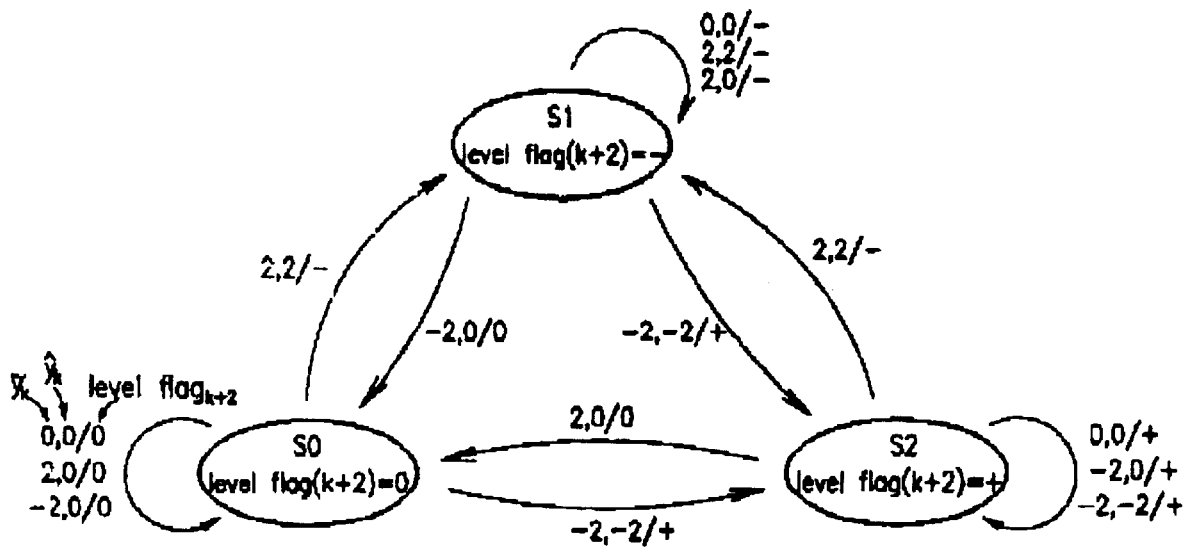
FIG. 9 illustrates operations of the level flag generating part shown in FIG. 8.
FIG. 10 is a table showing logic for the determining part shown in FIG. 8.

The operation of the level flag generating part 120 will now be explained. FIG. 9 illustrates operations of the level flag generating part shown in FIG. 8.

Referring to FIG. 9, there are level flag states of S0, S1, and S2, i.e., the level flags are classified into "0", "−", "+".

First, where the level flag is at S0 (initial state), a level flag "0" is generated both when the output from the comparing part 90 is "0," and the output from the reference comparing part 60 is "0." A level flag "0" also is generated both when the output from the comparing part 90 is "2" and the output from the reference comparing part 60 is "2" and when the output from the comparing part 90 is "−2," and the output from the reference comparing part 60 is "0". Under the condition that the level flag is "0" when the output from the comparing part 90 is "−2" and the output from the reference comparing part 60 is "−2," the level flag is at an S2 state, i.e., a positive level flag is generated. When the level flag is positive, i.e., when the level flag is at S2, if the output from the comparing part 90 is "+2" and the output from the reference comparing part 60 is "0" a level flag "0" is generated.

Second, when the level flag is at S1, i.e., at a negative state, the level flag is negative as it was when the output from the comparing part 90 is "0," and the output from the reference comparing part 60 is "0," and when the output from the comparing part 90 is "2," and the output from the reference comparing part 60 is "2." The level flag is also negative as it was when the output from the comparing part 90 is "2" and the output from the reference comparing part 60 is "0". When the level flag is at "−," if the output from the comparing part 90 is "−2," and the output from the reference comparing part is "0," the level flag is at an S0 state, i.e., a level flag "0" is generated. When the level flag is at S0, i.e., the output from the comparing part 90 is "2" and the output from the reference comparing part 60 is "2" the level flag is at an S1, i.e., a level flag of "−" is generated.

Third, when the level flag is at an S2 state, that is, when the level flag is at a positive state, if the output from the comparing part 90 is "0" and the output from the reference comparing part 60 is "0," and if the output from the comparing part 90 is "−2," and the output from the reference comparing part 60 is "0," the level flag maintains the positive state as it was. If the output from the comparing part 90 is "−2" and the output from the reference comparing part 60 is "−2" the level flag also maintains the positive state as it was. In this instance, under the condition that the level flag is at "−" if the output from the comparing part 90 is "−2" and the output from the reference comparing part 60 is "−2" the level flag is at an S2 state, i.e., a "+" level flag is generated. On the other hand, in case the level flag is at S2, if the output from the comparing part 90 is "2" and the output from the reference comparing part 60 is "+2" the level flag is at S1, i.e., a "−" flag is generated. The level flag thus generated in the level flag generating part 120 is delayed in the delays 70 and 71 for a predetermined period and applied to the determining part 140. The determining part 140 determines final data based on the level flag applied from the determining part 140 and the data from the comparing part 90, to restore user data.

Overall operation of the third embodiment of the present invention can be explained with reference to FIG. 11, which illustrates the data detection principle of the data restoring device shown in FIG. 8.

Referring to FIG. 11, if a signal from the equalizing part 40 in FIG. 8 has a value greater than +1+ref at t=k−6, both of the two outputs from the comparing part 90 and the reference comparing part 60 are +2. Accordingly, the level flag generating part 120 generates a "−" flag, which is applied to the next clock period of t=k−4. Since all the outputs from the comparing part 90 and the reference comparing part 60 are "0" at t=k−4, a "−" is generated as a level flag at t=k−2 according to FIG. 9. At the end, while the level flag maintains a "−" value until t=k+4, since the outputs from the comparing part 90 and the reference comparing part 60 are "−2" and "0" at t=k+4 respectively, the level flag at t=k+6, which is the next level flag, results in a value of "0." Since all the outputs from the comparing part 90 and the reference comparing part 60 have values of "2" at t=k+8 the level flag at t=k+10 results in a "−" value again.

As has been explained, the device for restoring data in a digital VCR according to the present invention is allowed to make confirmation on the redundancy satisfaction, not limited to adjoining two times, but extending to arbitrary time intervals. The present invention also corrects errors using signaling redundancy, which has been an oversight in the conventional art, and improves the reliability of the finally determined user data, thereby allowing obtaining of more accurate data.

It will be apparent to those skilled in the art that various modifications and variations can be made in device and method for restoring data in a digital VCR of the present invention without departing from the spirit or scope of the invention. Thus, it is intended that the present invention cover the modifications and variations of this invention provided they come within the scope of the appended claims and their equivalents.

What is claimed is:

1. A device for restoring data in a digital VCR having an equalizing part, the device comprising:
   first comparison detection means for comparing data from the equalizing part to a comparative reference level in detecting the data;
   delay means for delaying the data detected in the first comparison detection means for a predetermined time; and
   variable level comparison means for variably changing a compared reference value with reference to either an even series prior data or an odd series prior data received from the delaying means for producing user data in determining data of the present time received from the equalizing part.

2. A device as claimed in claim 1, wherein the comparative reference level in the first comparison detection means is ±1±ref.

3. A device as claimed in claim 1, wherein the first comparison detection means detects "+2" if the data from the equalizing part is greater than 1+ref, "−2" if the data from the equalizing part is smaller than −1−ref, and detects "0" if the data from the equalizing part falls within a range other than those stated the above.

4. A device as claimed in claim 3, wherein, when the detected data is +2 and the data from the equalizing part has a value greater than −1, "0" is detected, and when the detected data is +2 and the data from the equalizing part has a value smaller than −1, "1" is detected.

5. A device as claimed in claim 3, wherein, when the detected data is −2 and the data from the equalizing part has a value greater than +1, "1" is detected, and when the detected data is +2 and the data from the equalizing part has a value smaller than +1, "0" is detected.

6. A device as claimed in claim 1, wherein the delay means includes first and second delays for delaying the data detected in the first comparison detection means for a predetermined time.

7. A device for restoring data in a digital VCR having an equalizing part, the device comprising:
   first and second comparison detection means for comparing a signal from the equalizing part to a comparative reference level in detecting data;
   delay means for delaying the data detected in the second comparison detection means for a predetermined time; and
   logical comparison means utilized in determining data value of the present time received from the first comparison detection means, restoring user data according to a preset logical operation equation based both on an even series or an odd series prior data received from the delaying means and the data received at the present time.

8. A device as claimed in claim 7, wherein the first comparison detection means compares and detects data based on a comparative reference level of ±1.

9. A device as claimed in claim 7, wherein the second comparison detection means compares and detects data based on another comparative reference level of ±1±ref.

10. A device as claimed in claim 7, wherein the second comparison detection means detects "+2" if the data from the equalizing part is greater than a comparative reference level of 1+ref, detects "−2" if the data from the equalizing part is smaller than a comparative reference level of −1−ref, and detects "0" if the data from the equalizing part falls within a range other than those stated above.

11. A device as claimed in claim 7, wherein the logical comparison means restores user data of "0" when the data from the delay means and the first comparative detection means are (+2, +2), (+2, 0), (−2, 0), (−2, −2), (0, 0), respectively.

12. A device as claimed in claim 7, wherein the logical comparison means restores user data of "1" when the data from the delay means and the first comparative detection means are (+2, −2), (−2, +2), (0, +2), (0, +2), respectively.

13. A method for restoring data in a device for restoring the data in a digital VCR, the digital VCR having a magnetic reproduction head, the method comprising the steps of:
   (1) reproducing user data recorded in the digital VCR by the magnetic head;
   (2) comparing the reproduced user data to a preset comparative reference level in detecting data;
   (3) comparing the reproduced user data to a different preset another comparative reference level in determining data; and
   (4) in determining data value, at the present time, compared and detected in step (2), restoring the user data according to a preset logical operation equation based both on even series prior data values or odd series prior data values delayed in step (3) for a predetermined time and the data values compared and detected in the step (2).

14. A method as claimed in claim 13, wherein in step (4), user data "0" is restored when the data detected in step (2) is (+2, +2), (+2, 0), (−2, 0), (−2, −2), (0, 0), respectively.

15. A method as claimed in claim 13, wherein in step (4) user data "0" is restored when the data detected in the step (2) is (+2, −2), (−2, +2), (0, +2), (0, −2), respectively.

16. A device for restoring data in a digital VCR, the digital VCR having an equalizing part, the device comprising:
   first comparison detection means for comparing a signal from the equalizing part to a comparative reference level in detecting data;

second comparison detection means for comparing the signal from the equalizing part to a different comparative reference level in detecting data;

level flag generating means for generating a level flag according to the data detected in the first, and second comparison detection means;

delaying means for delaying the generated level flag for a predetermined time; and determining means for determining a slicing level according to the delayed level flag and the data detected in the first comparison detection means in determining final user data and restoring the final user data.

17. A device as claimed in claim 16, wherein the second comparison detection means compares and detects the data with reference to a different comparative reference level of ±1±ref.

18. A method for restoring data in a device for restoring data in a digital VCR, the digital VCR having a magnetic reproduction head, the method comprising the steps of:

(1) reproducing user data recorded in the digital VCR by the reproduction head;

(2) comparing the reproduced user data to a preset comparative reference level in detecting data;

(3) comparing the reproduced user data to a different preset comparative reference level in detecting data;

(4) generating +, −, and 0 level flags according to the data detected in steps (2) and (3); and (5) delaying the generated level flags for a predetermined time and comparing one of the delayed level flags and the data detected in step (2) in determining user data and restoring the determined user data.

19. A method as claimed in claim 18, wherein the comparative reference level in the step (2) is ±1±ref.

20. A method as claimed in claim 18, wherein in step (4), a level flag "0" is generated when the data detected in step (2) is "0", "2", or "−2" and the data detected in step (3) is "0".

21. A method as claimed in claim 18, wherein in step (4), when the level flag is at a "0" state, if the data detected in step (2) is "−2" and the data detected in step (3) is "−2," a positive (+) level flag is generated, and when the level flag is at a positive (+) state, if the data detected in step (2) is "2" and the data detected in step (3) is "0," a level flag "0" is generated.

22. A method as claimed in claim 18, wherein in step (4) when the level flag is at a negative state, both if the data detected in step (2) is "0" and the data detected in step (3) is "0", and if both of the data detected in step (2) is "2" and the data detected in step (3) is "2", the negative (−) level flag is maintained at its previous state and if both of the data detected in step (2) is "2" and the data detected in the step (3) is "0", the negative (−) level flag is also maintained at its previous state.

23. A method as claimed in claim 18, wherein in step (4) when the level flag is at a negative state, if both of the data detected in the step (2) is "−2" and the data detected in step (3) is "0," a level flag "0" is generated, and in the level flag "0" state, if both of the data detected in step (2) is "2" and the data detected in the step (3) is "2", a negative (−) level flag is generated.

24. A method as claimed in claim 18, wherein, in step (4) when the level flag is at a positive state, if both of the data detected in step (2) is "0," or "−2" and the data detected in step (3) is "0," and if both of the data detected in step (2) is "−2" and the data detected in step (3) is "−2," the positive (+) level flag is maintained at its previous state.

25. A method as claimed in claim 18, wherein in step (5), if the data detected in step (2) and the level flags generated in step (4) is (0, 0), (0, +), (0, −), (2, −), (−2, +) respectively, user data is determined as being "0".

26. A method as claimed in claim 18, wherein in step (5), if the data detected in step (2) and the level flags generated in step (4) are (2, 0), (2, +), (−2, 0), (−2, −) respectively, user data is determined as being "1.

* * * * *